US011589335B2

(12) United States Patent
Xue et al.

(10) Patent No.: US 11,589,335 B2
(45) Date of Patent: Feb. 21, 2023

(54) CHAINED SIDELINK TRANSMISSIONS

(71) Applicant: QUALCOMM Incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 16/671,409

(22) Filed: Nov. 1, 2019

(65) Prior Publication Data

US 2021/0136740 A1 May 6, 2021

(51) Int. Cl.
*H04W 72/02* (2009.01)
*H04W 72/04* (2023.01)
*H04W 92/18* (2009.01)

(52) U.S. Cl.
CPC ........ *H04W 72/0406* (2013.01); *H04W 92/18* (2013.01)

(58) Field of Classification Search
CPC .. H04W 72/0406; H04W 92/18; H04W 72/02
USPC ........................................................ 370/329
See application file for complete search history.

(56) References Cited

U.S. PATENT DOCUMENTS

| | | | | |
|---|---|---|---|---|
| 2018/0049220 A1* | 2/2018 | Patil | .................. | H04W 72/0426 |
| 2018/0063816 A1* | 3/2018 | Gulati | ............... | H04W 72/1289 |
| 2018/0324823 A1* | 11/2018 | Martin | .................. | H04W 76/14 |
| 2019/0387377 A1* | 12/2019 | Zhang | ................. | H04W 52/281 |
| 2020/0029353 A1* | 1/2020 | Xu | ..................... | H04W 52/0209 |
| 2020/0037343 A1* | 1/2020 | He | ......................... | H04L 1/1893 |
| 2020/0163103 A1* | 5/2020 | Kuang | .................. | H04W 72/04 |
| 2020/0322024 A1* | 10/2020 | Cheng | ................... | H04B 17/327 |
| 2020/0366427 A1* | 11/2020 | Wang | ..................... | H04L 1/1861 |
| 2020/0389257 A1* | 12/2020 | Kung | ..................... | H04L 1/1854 |
| 2021/0007096 A1* | 1/2021 | Huang | .................. | H04W 72/02 |
| 2021/0219320 A1* | 7/2021 | Belleschi | ........... | H04W 72/1278 |
| 2021/0297199 A1* | 9/2021 | Miao | ...................... | H04L 1/1896 |
| 2021/0314962 A1* | 10/2021 | Ashraf | .................. | H04W 24/10 |

* cited by examiner

*Primary Examiner* — Kwang B Yao
*Assistant Examiner* — Syed M Bokhari
(74) *Attorney, Agent, or Firm* — Holland & Hart / Qualcomm

(57) ABSTRACT

Methods, systems, and devices for wireless communications are described. The described techniques relate to improved methods, systems, devices, and apparatuses that support chained sidelink transmissions. A transmitting user equipment (UE) may send, to a receiving UE, sidelink control information (SCI) that reserves resources for transmission from the transmitting UE as well as reserves resources for a response transmission from the receiving UE. The receiving UE may respond with a transmission using the resources that were reserved in the SCI and without sending its own SCI to reserve resources for the response. The latency between the transmitting UE sending the first transmission and receiving a response from the receiving UE may be reduced, because the transmitting UE reserved the resources for itself and the receiving UE with the same SCI.

30 Claims, 13 Drawing Sheets

CHAINED SIDELINK TRANSMISSIONS

FIELD OF TECHNOLOGY

The following relates generally to wireless communications and more specifically to chained sidelink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless device (e.g., a user equipment (UE)) may communicate with other UEs over a sidelink. In some cases, a transmitting UE communicates over a sidelink with a receiving UE by sending sidelink control information (SCI) to reserve resources for the transmission and once the resources are reserved, sending a transmission. Additionally, the receiving UE may also perform the reservation process before transmitting a response. The resulting latency from both UEs performing the reservation process during communications may introduce latency and other inefficiencies into wireless communications systems.

SUMMARY

The described techniques relate to improved methods, systems, devices, and apparatuses that support chained sidelink transmissions. Generally, the described techniques provide for a transmitting user equipment (UE) sending, to a receiving UE, sidelink control information (SCI) that reserves resources for transmission from the transmitting UE as well as reserves resources for a response transmission from the receiving UE. The receiving UE may respond with a transmission using the resources that were reserved in the SCI and without sending its own SCI to reserve resources for the response. The latency between the transmitting UE sending the first transmission and receiving a response from the receiving UE may be reduced, because the transmitting UE reserved the resources for itself and the receiving UE with the same SCI.

A method of wireless communications is described. The method may include receiving, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission, receiving, from the first UE at the second UE, the first data transmission over the first set of resources, and transmitting, from the second UE, the second data transmission using the second set of resources.

An apparatus for wireless communications is described. The apparatus may include a processor, memory coupled with the processor, and instructions stored in the memory. The instructions may be executable by the processor to cause the apparatus to receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission, receive, from the first UE at the second UE, the first data transmission over the first set of resources, and transmit, from the second UE, the second data transmission using the second set of resources.

Another apparatus for wireless communications is described. The apparatus may include means for receiving, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission, receiving, from the first UE at the second UE, the first data transmission over the first set of resources, and transmitting, from the second UE, the second data transmission using the second set of resources.

A non-transitory computer-readable medium storing code for wireless communications is described. The code may include instructions executable by a processor to receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission, receive, from the first UE at the second UE, the first data transmission over the first set of resources, and transmit, from the second UE, the second data transmission using the second set of resources.

Some examples of the method, apparatuses, and non-transitory computer-readable medium described herein may further include operations, features, means, or instructions for receiving updated sidelink control information that indicates a modification to the second reservation of the second set of resources for the second data transmission.

Some examples of the method, apparatuses, and non-transitory computer-readable medium described herein may further include operations, features, means, or instructions for receiving subsequent sidelink control information that voids any previously transmitted sidelink control information with a same identifier as the subsequent sidelink control information.

In some examples of the method, apparatuses, and non-transitory computer-readable medium described herein, the sidelink control information includes a sidelink control information message.

In some examples of the method, apparatuses, and non-transitory computer-readable medium described herein, the sidelink control information includes a first sidelink control information message associated with the first reservation and a second sidelink control information message associated with the second reservation.

In some examples of the method, apparatuses, and non-transitory computer-readable medium described herein, the first sidelink control information message and the second sidelink control information message include stage one sidelink control information messages.

In some examples of the method, apparatuses, and non-transitory computer-readable medium described herein, the second sidelink control information message includes an identifier that identifies the second UE, a receiving UE of the second data transmission, or both.

In some examples of the method, apparatuses, and non-transitory computer-readable medium described herein, transmitting the second data transmission may include operations, features, means, or instructions for transmitting the second data transmission to the first UE.

In some examples of the method, apparatuses, and non-transitory computer-readable medium described herein, transmitting the second data transmission may include operations, features, means, or instructions for transmitting the second data transmission to a third UE that may be associated with the first UE.

In some examples of the method, apparatuses, and non-transitory computer-readable medium described herein, the first set of resources and the second set of resources may be from separate resource pools.

In some examples of the method, apparatuses, and non-transitory computer-readable medium described herein, the sidelink control information indicates a third set of resources for a third data transmission from the second UE in response to the first data transmission.

In some examples of the method, apparatuses, and non-transitory computer-readable medium described herein, the second set of resources and the third set of resources schedule the second data transmission and the third data transmission for simultaneous transmission.

In some examples of the method, apparatuses, and non-transitory computer-readable medium described herein, the second set of resources and the third set of resources schedule the second data transmission and the third data transmission with a timing offset.

Some examples of the method, apparatuses, and non-transitory computer-readable medium described herein may further include operations, features, means, or instructions for validating the second reservation of the second set of resources for the second data transmission by attempting to detect the second data transmission.

A method of wireless communications is described. The method may include transmitting, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission and transmitting, from the first UE to the second UE, the first data transmission using the first set of resources.

An apparatus for wireless communications is described. The apparatus may include a processor, memory coupled with the processor, and instructions stored in the memory. The instructions may be executable by the processor to cause the apparatus to transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission and transmit, from the first UE to the second UE, the first data transmission using the first set of resources.

Another apparatus for wireless communications is described. The apparatus may include means for transmitting, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission and transmitting, from the first UE to the second UE, the first data transmission using the first set of resources.

A non-transitory computer-readable medium storing code for wireless communications is described. The code may include instructions executable by a processor to transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission and transmit, from the first UE to the second UE, the first data transmission using the first set of resources.

Some examples of the method, apparatuses, and non-transitory computer-readable medium described herein may further include operations, features, means, or instructions for reserving autonomously at the first UE the first set of resources and the second set of resources.

Some examples of the method, apparatuses, and non-transitory computer-readable medium described herein may further include operations, features, means, or instructions for receiving a grant from a base station indicating the first set of resources, and reserving autonomously at the first UE the second set of resources.

Some examples of the method, apparatuses, and non-transitory computer-readable medium described herein may further include operations, features, means, or instructions for transmitting updated sidelink control information that indicates a modification to the second reservation of the second set of resources for the second data transmission.

Some examples of the method, apparatuses, and non-transitory computer-readable medium described herein may further include operations, features, means, or instructions for transmitting subsequent sidelink control information that voids any previously transmitted sidelink control information with a same identifier as the subsequent sidelink control information.

In some examples of the method, apparatuses, and non-transitory computer-readable medium described herein, the sidelink control information includes a sidelink control information message.

In some examples of the method, apparatuses, and non-transitory computer-readable medium described herein, the sidelink control information includes a first sidelink control information message associated with the first reservation and a second sidelink control information message associated with the second reservation.

In some examples of the method, apparatuses, and non-transitory computer-readable medium described herein, the first sidelink control information message and the second sidelink control information message include stage one sidelink control information messages.

In some examples of the method, apparatuses, and non-transitory computer-readable medium described herein, the second sidelink control information message includes an identifier that identifies the second UE, a receiving UE of the second data transmission, or both.

Some examples of the method, apparatuses, and non-transitory computer-readable medium described herein may further include operations, features, means, or instructions for receiving, from the second UE, the second data transmission over the second set of resources.

In some examples of the method, apparatuses, and non-transitory computer-readable medium described herein, the first set of resources and the second set of resources may be from separate resource pools.

In some examples of the method, apparatuses, and non-transitory computer-readable medium described herein, the sidelink control information indicates a third set of resources for a third data transmission from the second UE in response to the first data transmission.

In some examples of the method, apparatuses, and non-transitory computer-readable medium described herein, the second set of resources and the third set of resources schedule the second data transmission and the third data transmission for simultaneous transmission.

In some examples of the method, apparatuses, and non-transitory computer-readable medium described herein, the second set of resources and the third set of resources schedule the second data transmission and the third data transmission with a timing offset.

DETAILED DESCRIPTION

Figure 1:
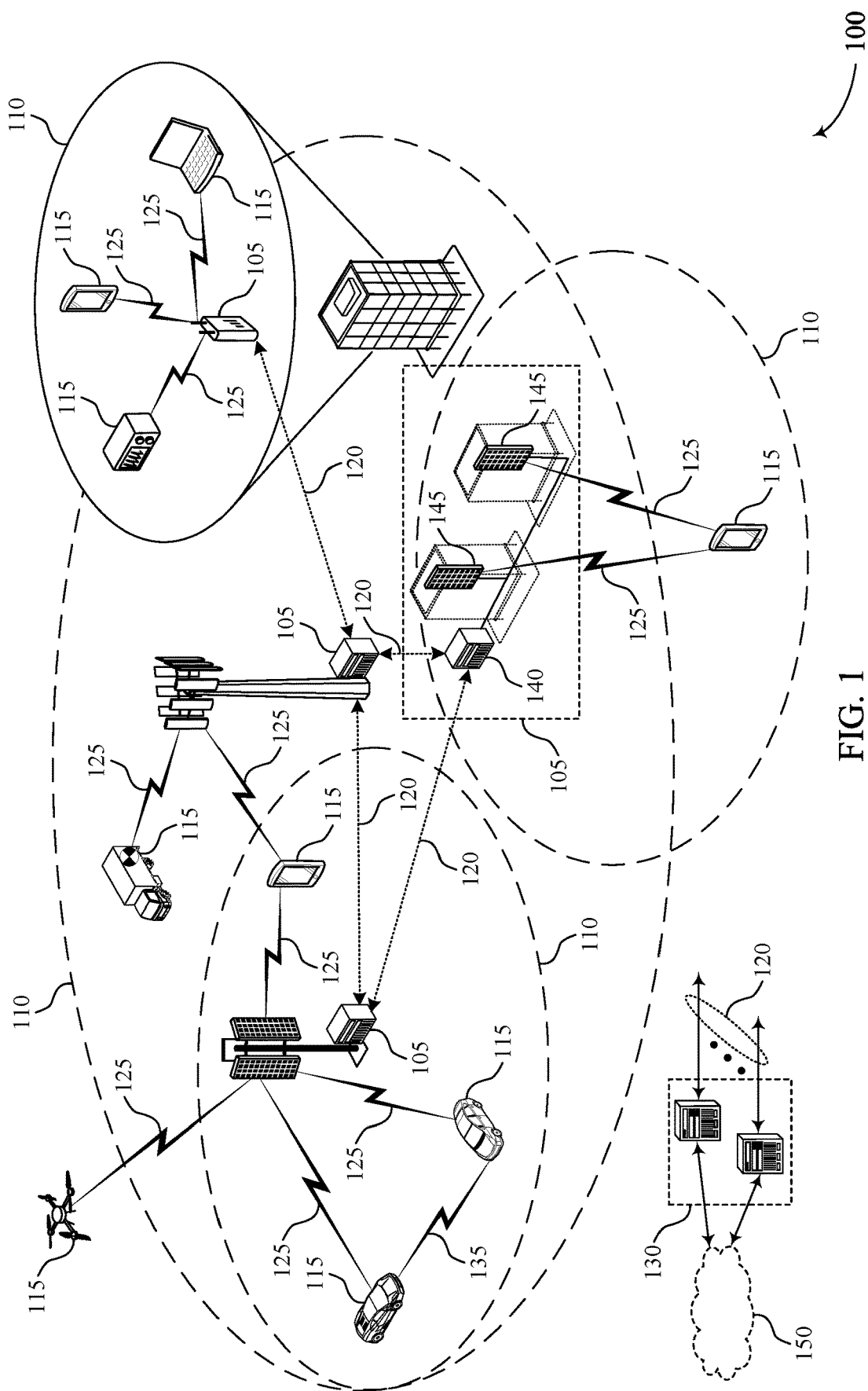
FIG. 1 illustrates an example of a system for wireless communications that supports chained sidelink transmissions in accordance with aspects of the present disclosure.

A wireless communications system may support sidelinks for communications between wireless devices. A sidelink may refer to any communication link between similar wireless devices (e.g., a communication link between user equipments (UEs), a backhaul communication link between base stations, etc.). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X), enhanced V2X (eV2X), and/or vehicle-to-vehicle (V2V) communications, message relaying, discovery signaling, beacon signaling, or any combination of these or other signals transmitted over-the-air from one wireless device to one or more other wireless devices.

As demand for sidelink communication increases, (e.g., due to increased V2X demand for autonomous and semi-autonomous vehicles, D2D communication between Internet-of-Things (IoT) devices, factory automation etc.), techniques to efficiently and reliably enhance throughput and reliability of sidelink channels is desirable. In some cases, sidelink groupcast communications may be desired, in which one transmitting device may transmit signals to multiple other devices (e.g., a vehicle that transmits sensor data to multiple other vehicles via sidelink communications).

EV2X communications may include a message-based reservation of transmission resources. A transmitting UE communicating over a sidelink may reserve resources in a channel (e.g., physical sidelink control channel (PSCCH), physical sidelink shared channel (PSSCH), and physical sidelink feedback channel (PSFCH)) by sending an SCI (e.g., an SCI message or messages) to a receiving UE. The SCI may include a request to reserve resources for sending a transmission (e.g., data transmission) to the receiving UE. The receiving UE may send an acknowledgment feedback (e.g., HARQ ACK/NACK feedback) to the transmitting UE to confirm the reservation of the resources and the transmitting UE may send the transmission. To respond to the transmission from the transmitting UE, the receiving UE may perform the reservation procedure of sending an SCI to the transmitting UE to request the reservation of resources to send a transmission. Once the resources are reserved, such as the transmitting UE sending an ACK, the receiving UE may send a response transmission to the transmitting UE or to another UE. Latency in the wireless communications system may increase during communications when the transmitting and receiving UE are both reserving resources. Additionally, the reservation of resources may be delayed if multiple UEs are competing for the same resources, which may result in an increased latency.

In some cases, transmissions are chained together to reduce latency. Chained transmissions may refer to the receiver for a first data transmission being the transmitter for a second data transmission. For example, the transmitting UE may reserve resources (e.g., using autonomous reservation or using a mix of grant based and autonomous reservation) for a transmission from the transmitting UE and for the receiving UE to send a response transmission and may send an SCI to the receiving UE indicating the reserved resources. Such techniques may reduce latency by eliminating the receiving UE sending an SCI to reserve resources for its own transmission. The chained transmission may be unicast to one UE, groupcast or broadcast to multiple UEs.

In some cases, the transmitting UE receives a grant from a base station which indicates the resources for a transmission from the transmitting UE. The transmitting UE may send an SCI to the receiving UE to reserve resources for a transmission from the receiving UE. In other cases, the SCI includes an SCI message for the reservation of resources for the transmitting UE and another SCI message for the reservation of resources for the receiving UE. The transmitting UE may send an SCI to the receiving UE with an updated or modified reservation of resources request.

Particular aspects of the subject matter described herein may be implemented to realize one or more advantages. The described techniques may support improvements in reserving channel resources for sidelink communications, decreasing signaling overhead, and improving reliability, reducing latency, among other advantages. As such, supported techniques may include improved network operations and, in some examples, may promote network efficiencies, among other benefits.

Aspects of the disclosure are initially described in the context of exemplary wireless communications systems. Aspects of the disclosure are further illustrated by and described with reference to apparatus diagrams, system diagrams, and flowcharts that relate to chained sidelink transmissions.

FIG. 1 illustrates an example of a wireless communications system 100 that supports chained sidelink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a transmitting UE 115 may send, to a receiving UE 115, an SCI that reserves resources for transmission from the transmitting UE 115 as well as reserves resources for a response transmission from the receiving UE 115. The receiving UE 115 may respond with a transmission using the resources that were reserved in the SCI and without sending its own SCI to reserve resources for the response. The latency between the transmitting UE sending the first transmission and receiving a response from the receiving UE may be reduced, because the transmitting UE reserved the resources for itself and the receiving UE with the same SCI.

Figure 2:
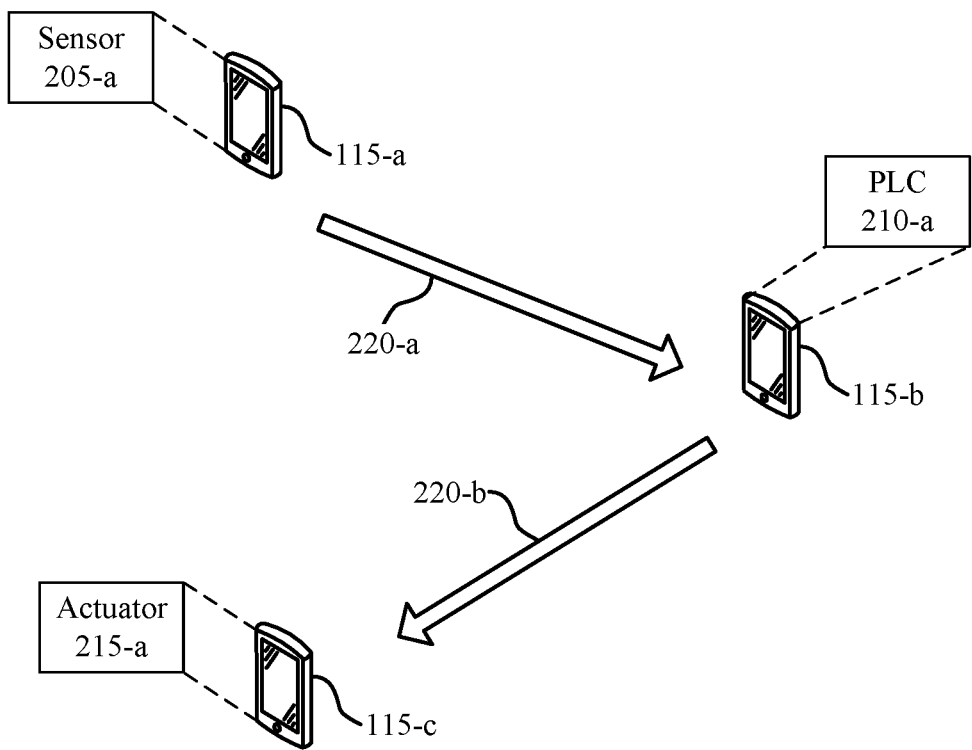
FIG. 2 illustrates an example of a wireless communications system that supports chained sidelink transmissions in accordance with aspects of the present disclosure.
Figure 2:
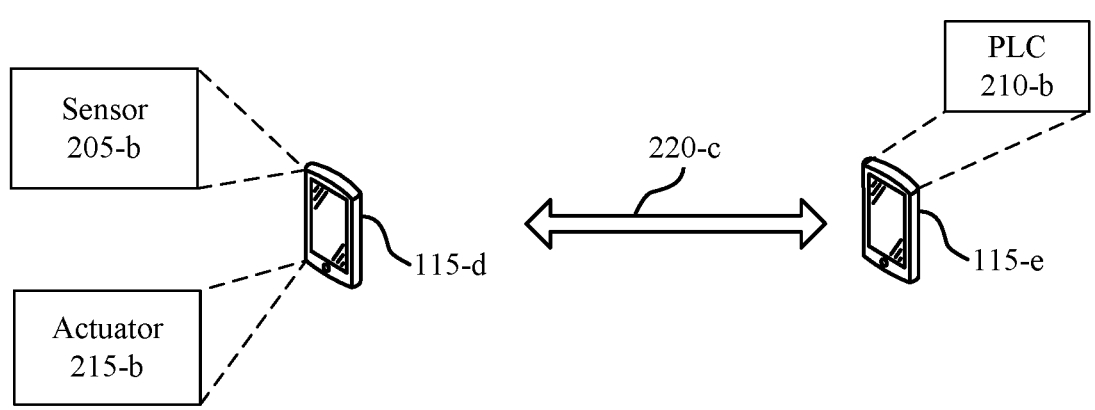

FIG. 2 illustrates an example of a wireless communications system 200 that supports chained sidelink transmissions in accordance with aspects of the present disclosure. In some examples, wireless communications system 200 may implement aspects of wireless communication system 100. In some examples, the wireless communications system 200 may include a UE 115-a, a UE 115-b, a UE 115-c, a UE 115-d, and a UE 115-e which may be examples of Ues 115 described with reference to FIG. 1. One or more of the UEs 115 may communicate with each other using a corresponding sidelink 220. In this example, the UE 115-a may communicate with UE 115-b via sidelink 220-a, UE 115-b may communicate with UE 115-c via sidelink 220-b, and UE 115-d may communicate with UE 115-e via sidelink 220-c.

The wireless communications system 200 may be an example of an industrial Internet-of-Things (IIoT) system, however, the techniques described herein may be applicable to any sidelink or message based reservation system. IIoT systems may include sensors sending sensed data to servers or similar network equipment. The network equipment may perform calculations based on the sensed data and may send a command or similar message to an actuator to perform an action in response to the sensed data. In some examples, IIoT systems may impose a latency requirement of 1 ms or less between a sensor sensing a changing parameter and a command message arriving at an actuator based on the sensed data. For example, the process may include a sensor sensing a changing parameter, an embedded computer at the sensor compiling the data, transmitting the data to a receiver at a programmable logic controller (PLC) (e.g., control or steering server), the transmitter of the PLC sending the data to the receiver of an actuator on a wireless device and the embedded computer of the actuator analyzing the data and making an adjustment based on the changing parameter the sensor detected. In such an example, the user interface may have a latency of 0.3 ms and the radio interface may have a latency of 0.2 ms.

This communication exchange from the sensor to the actuator may be performed in two over the air (OTA) sidelink transmissions. For example, sensor 205-a may include or serve as a UE 115-a, PLC 210-a may include or serve as a UE 115-b, and actuator 215-a may include or serve as a UE 115-c. PLC 210-a could be configured as a base station (e.g., a gNB) instead of as a UE, but such a configuration may add complexity to the system. In an example, sensor 205-a may detect a changing parameter, and UE 115-a may send the first transmission over sidelink 220-a to PLC 210-a. UE 115-b may send the second transmission over sidelink 220-b to actuator 215-a. In some cases, the sensor and actuator may share the same radio (e.g., UE 115-d may include sensor 205-b and actuator 215-b).

In some cases, sensors, actuators, and PLCs have redundant communication requirements based on reliability. Redundant communications may result in additional complexity due to sensors, PLCs, and actuators managing multiple transmissions to relay information from a sensor to an actuator.

Radio resource allocation may include Uu-controlled allocation (e.g., controlled by a base station sending a grant indicating available resources), which may be referred to as Mode 1 resource allocation. Additionally or alternatively, radio resource allocation may include UE autonomous resource allocation, which may be referred to as Mode 2 resource allocation. In some examples, implementing Mode 2 resource allocation techniques may provide additional scheduling flexibility. In some cases (e.g., IIoT systems implementing an eV2X design), to implement UE autonomous resource allocation, a message-based reservation scheme may be used. For example, UE 115-d (e.g., associated with sensor 205-b and actuator 215-b) may select resources for a reservation in a channel at a data packet arrival time $n_a$ for a data transmission. UE 115-d may then send an SCI at a time $n_r$, where $n_r \geq n_a + T_1$ and $T_1$ is the processing time at UE 115-d. The SCI may indicate the selected resources, and in some cases, may request an acknowledgment from the receiving UE. The UE 115-d may then send the data transmission at a time $n_1$, where $n_1 \geq 2 T_1 + n_a$.

For UE 115-e to respond with a data transmission, UE 115-e may perform the same reservation procedure as UE 115-d. For example, UE 115-e may send an SCI to reserve resources for a transmission to UE 115-d, and UE 115-e may send the data transmission to UE 115-d. Both UE 115-d and UE 115-e performing the reservation process for a transmission may cause latency and increased over head signaling.

In accordance with aspects of the present disclosure, to reduce latency, when a communication system employs UE autonomous resource allocation (e.g., Mode 2 or a mix of Mode 2 and Mode 1), a UE may reserve resources for a second data transmission (or multiple data transmissions) chained after the current data transmission, and may indicate the reserved resources in an SCI. Chained transmissions may refer to the receiver for a first data transmission being the transmitter for a second data transmission.

In a first example, UE 115-a detects a changing parameter and sends this information to UE 115-b. UE 115-b may send a message (e.g., a command message) to UE 115-c based on the message from UE 115-a. To send these messages, UE 115-a may send an SCI to UE 115-b which reserves radio resources for the data transmission of the changing parameters from sensor 205-a to PLC 210-a, and the data transmission from PLC 210-a to actuator 215-a. That is, UE 115-a may autonomously reserve resources for both data transmissions (according to Mode 2) and may signal these reservations in a single SCI (or multiple SCIs), thereby allowing UE 115-b to bypass the procedure of sending its own SCI, which may reduce latency in the system.

In a second example, of autonomous resource allocation, UE 115-d, with sensor 205-a and actuator 215-b, may send an SCI to reserve a set of channel resources for a first data transmission from UE 115-d to UE 115-e with PLC 210-b, and reserve a second set of resources for a second data transmission from UE 115-e to UE 115-d. Similar to the first example, in this example, the SCI sent from UE 115-d indicates a reservation of resources for both data transmissions, thereby reducing latency by alleviating the need for UE 115-e to send its own SCI. In this example, the second data transmission may be referred to as being chained to the first data transmission.

In some examples, the transmitting UE (e.g., UE 115-a or 115-e) may use a mix of Mode 1 and Mode 2 reservation techniques. For example, the transmitting UE may receive a grant from a base station indicating resources to use for its own data transmission (according to Mode 1), but the transmitting UE may autonomously reserve resources for the receiving UE to send the response message (according to Mode 2). In such an example, the transmitting UE may send an SCI indicating the reserved resources for the first and second transmissions. In some cases, an SCI may reserve multiple sets of resources. The set of resources for the second transmission (e.g., UE 115-b to UE 115-c) may be from a separate resource pool than the set of resources for the first transmission (e.g., UE 115-a to UE 115-b). Additionally or alternatively, resources for Uu-controlled allocation (i.e., Mode 1) and resources for UE autonomous allocation (i.e., Mode 2) may be from separate resource pools.

In some examples, the transmitting UE (e.g., UE 115-a or 115-e) may use an SCI for reservation techniques. UE 115-a may reserve multiple sets of resources for multiple chained transmissions. For example, UE 115-a may reserve resources for UE 115-b to send data transmissions to other UEs, relay information to UE 115-c, send a different transmission to UE 115-c, or send a response transmission to UE 115-a. The multiple sets of resources may allow the UEs to send simultaneous transmissions or sequential transmissions with a time offset (e.g., repetitions to increase reliability). In some cases, the reservation of multiple chained transmissions may be signaled with additional SCIs other than the SCI used for the first data transmission. The multiple SCIs may include stage one SCI messages in a two stage SCI system. A two stage SCI system may refer to an SCI which has a first set of resources (e.g., stage one) and a second set of resources (e.g., stage two). In some cases, the stage one SCI message includes an identifier (ID) which indicates the chained data transmission between the UEs. The ID may be a layer one ID for the transmitter (e.g., UE 115-*a* or UE 115-*d*) of the chained data transmission as well as a layer one ID of the receiver (e.g., UE 115-*b*, UE 115-*c*, or UE 115-*e*) of the chained data transmission.

In some examples, the transmitting UE (e.g., UE 115-*a* or 115-*e*) may use reservation updating techniques. For example, a transmitting UE (e.g., UE 115-*a* or UE 115-*d*) may send an additional SCI with an updated or modified reservation (e.g., with a delayed transmission time) for the chained data transmission. The modified reservation may be for a retransmission of a previous data transmission. The transmitter UE may use the latest SCI it sends for resource reservation for a transmission or for a receiver UE to send a transmission.

In some examples, the receiving UE (e.g., UE 115-*b*, UE 115-*c*, or UE 115-*e*) may perform techniques to validate the reservation of channel resources by the transmitting UE. A transmitting UE (e.g., UE 115-*a* or UE 115-*d*) may send another SCI to reserve a set of channel resources, after the first SCI, which may invalid or void any previously transmitted SCI with the same ID as the subsequent SCI for sidelink resource reservation. In some cases, the receiving UE (e.g., UE 115-*b*, UE 115-*c*, or UE 115-*e*) has to compete for channel access. The receiving UE may validate an SCI from the transmitting UE by searching for the corresponding data transmission from the transmitting UE. The receiving UE may search for PSSCH demodulation reference signal (DMRS), perform energy detection, or search for the corresponding stage two SCI in the two stage SCI system.

Figure 3:
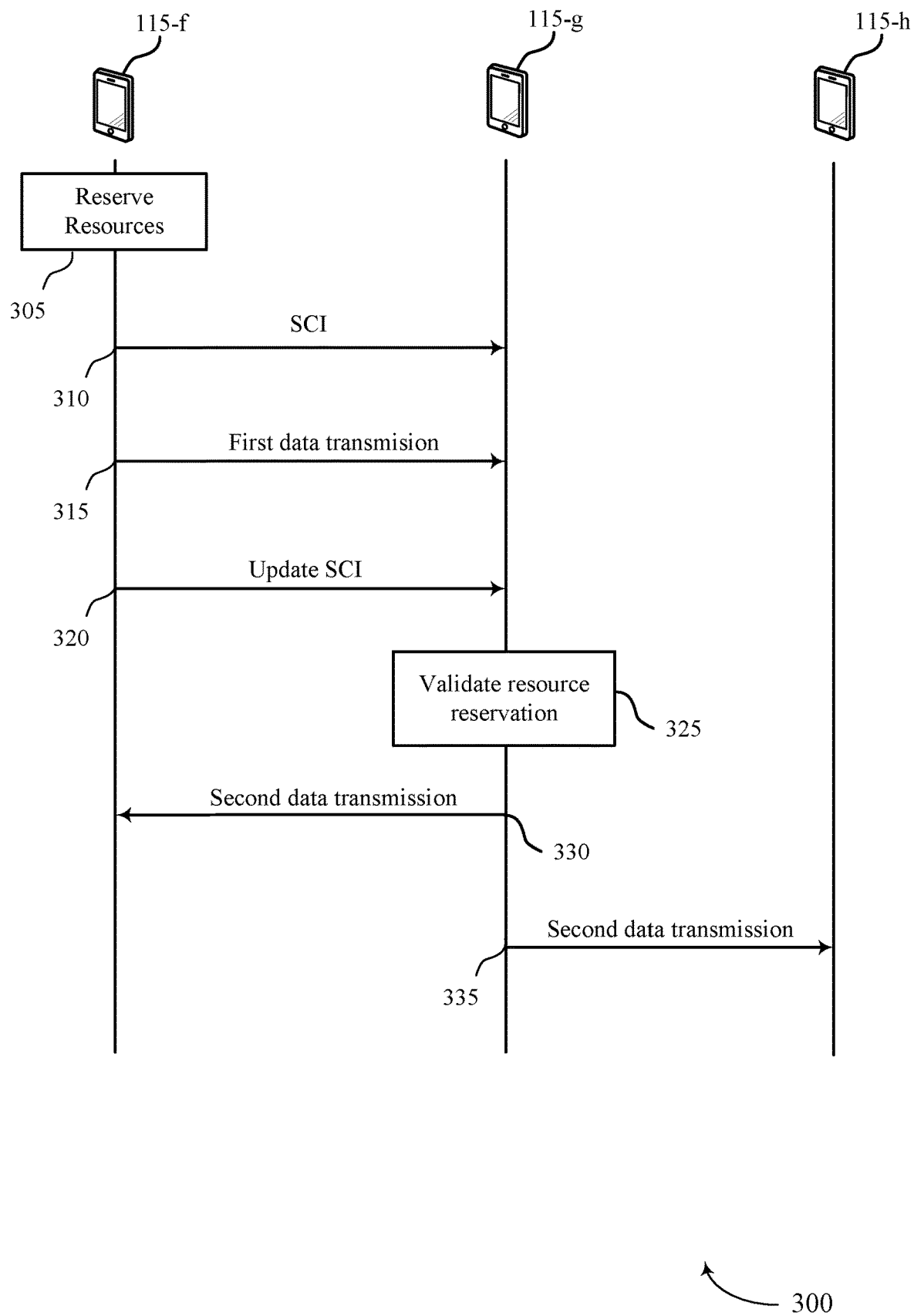
FIG. 3 illustrates an example of a process flow that supports chained sidelink transmissions in accordance with aspects of the present disclosure.

FIG. 3 illustrates an example of a process flow 300 that supports chained sidelink transmissions in accordance with aspects of the present disclosure. In some examples, process flow 300 may implement aspects of wireless communication system 100. In some examples, process flow 300 may implement aspects of wireless communications system 100 or 200. Process flow 300 may be implemented by transmitting UE 115-*f*, receiving UEs 115-*g* and UE 115-*h*, or any other examples of UEs 115 as described herein. Alternative examples of the following may be implemented, where some steps are performed in a different order than described or are not performed at all. In some cases, steps may include additional features not mentioned below, or further steps may be added.

At 305, UE 115-*f* may reserve autonomously the first set of resources and the second set of resources (e.g., using Mode 2). In some cases, UE 115-*f* may receive a grant from a base station indicating the first set of resources and UE 115-*f* may reserve autonomously the second set of resources (e.g., using a mix of Mode 1 and Mode 2). The first set of resources and the second set of resources may be from separate resource pools.

At 310, UE 115-*f* may transmit, to UE 115-*g*, an SCI, wherein the SCI may indicate a first reservation of a first set of resources for a first data transmission from UE 115-*f* to the UE 115-*g* and a second reservation of a second set of resources for a second data transmission from UE 115-*g* in response to the first data transmission. The SCI may be a single SCI message or may include a first SCI message associated with the first reservation and a second SCI message associated with the second reservation. The first SCI message and the second SCI message may include a stage one SCI message. In some cases, the SCI message may include an ID that identifies the UE 115-*g*, a receiving UE (e.g., UE 115-*h*) of the second data transmission, or both.

At 315, UE 115-*f* may transmit, to UE 115-*g*, the first data transmission using the first set of resources.

At 320, UE 115-*f* may transmit an updated SCI that indicates a modification to the second reservation of the second set of resources for the second data transmission. UE 115-*f* may transmit a subsequent SCI that voids any previously transmitted SCI with the same ID as the subsequent SCI. In some cases, an SCI may indicate a third set of resources for a third data transmission from UE 115-*g* in response to the first data transmission. The second set of resources and the third set of resources may schedule the second data transmission and the third data transmission for simultaneous transmissions or transmissions with a timing offset.

At 325, UE 115-*g* may validate the second reservation of the second set of resources for the second data transmission by attempting to detect the second data transmission.

At 330, UE 115-*g* may transmit the second data transmission to UE 115-*f* using the second set of resources.

At 335, UE 115-*g* may transmit the second data transmission to UE 115-*h* that is associated with UE 115-*f*.

Figure 4:
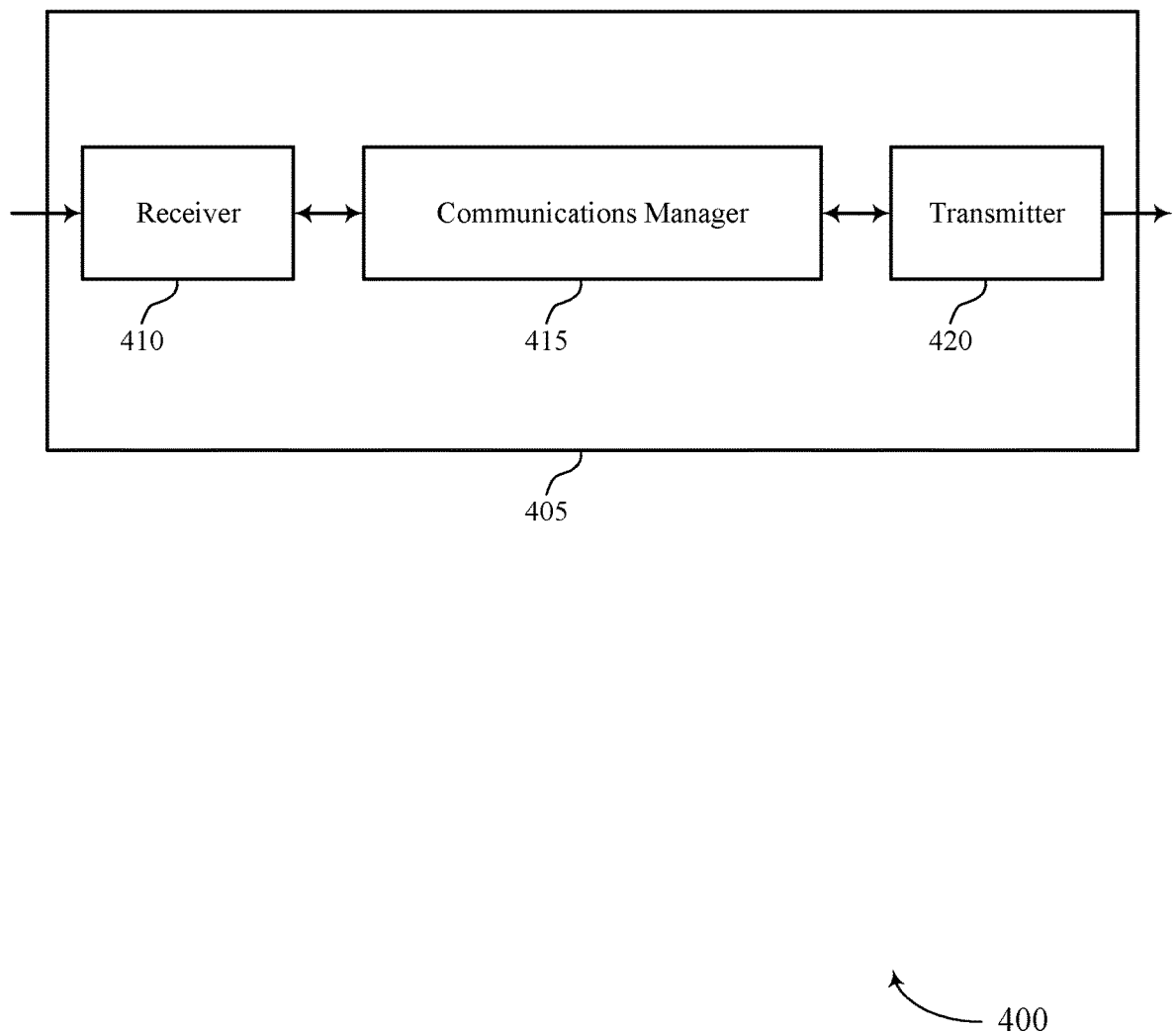
FIGS. 4 and 5 show block diagrams of devices that support chained sidelink transmissions in accordance with aspects of the present disclosure.

FIG. 4 shows a block diagram 400 of a device 405 that supports chained sidelink transmissions in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to chained sidelink transmissions, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission, receive, from the first UE at the second UE, the first data transmission over the first set of resources, and transmit, from the second UE, the second data transmission using the second set of resources. The communications manager 415 may also transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission and transmit, from the first UE to the second UE, the first data transmission using the first set of resources. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to receive an SCI indicating the reservation of resources for a transmission over a sidelink to another UE. This reservation of resources may increase reliability and reduce latency during sidelink transmissions.

Based on techniques for implementing feedback for grant-free uplink transmissions as described herein, a processor of a UE 115 (e.g., controlling the receiver 410, the transmitter 420, or the transceiver 720 as described with reference to FIG. 7) may increase reliability and decrease signaling overhead in the communication over sidelinks because the receiving UE 115 may avoid going through unnecessary resources reservation processes during transmissions.

Figure 5:
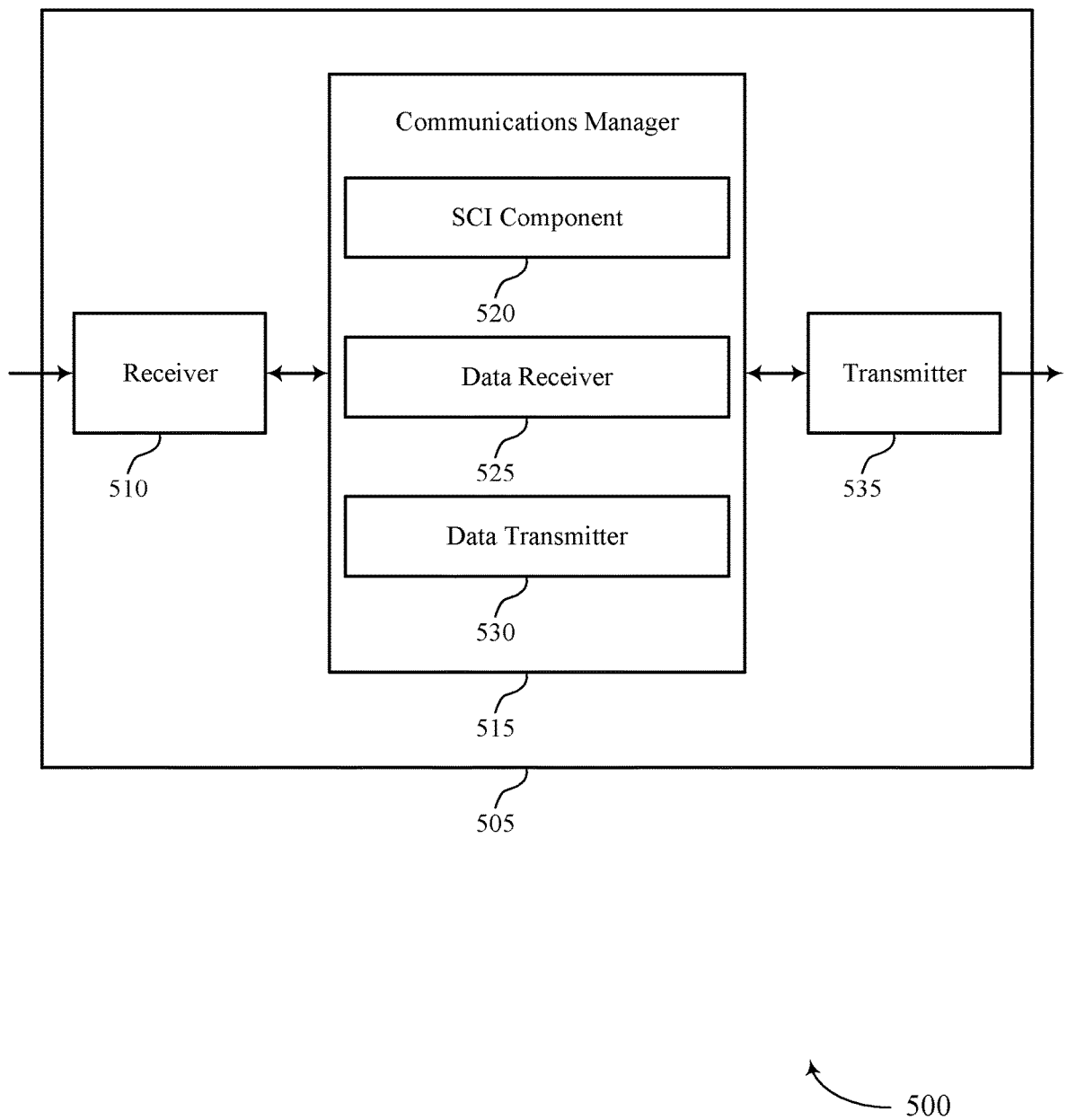

FIG. 5 shows a block diagram 500 of a device 505 that supports chained sidelink transmissions in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to chained sidelink transmissions, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a SCI component 520, a data receiver 525, and a data transmitter 530. The communications manager 515 may be an example of aspects of the communications manager 710 described herein.

The SCI component 520 may receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The data receiver 525 may receive, from the first UE at the second UE, the first data transmission over the first set of resources. The data transmitter 530 may transmit, from the second UE, the second data transmission using the second set of resources.

The SCI component 520 may transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The data transmitter 530 may transmit, from the first UE to the second UE, the first data transmission using the first set of resources.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

In some examples, the communications manager 515 may be implemented as an integrated circuit or chipset for a mobile device modem, and the receiver 510 and transmitter 535 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive an SCI indicating the reservation of resources for a transmission over a sidelink to another UE. This reservation of resources may increase reliability and reduce latency during sidelink transmissions.

Based on techniques for implementing feedback for grant-free uplink transmissions as described herein, a processor of a UE 115 (e.g., controlling the receiver 510, the transmitter 535, or the transceiver 720 as described with reference to FIG. 7) may increase reliability and decrease signaling overhead in the communication over sidelinks because the receiving UE 115 may avoid going through unnecessary resources reservation processes during transmissions.

Figure 6:
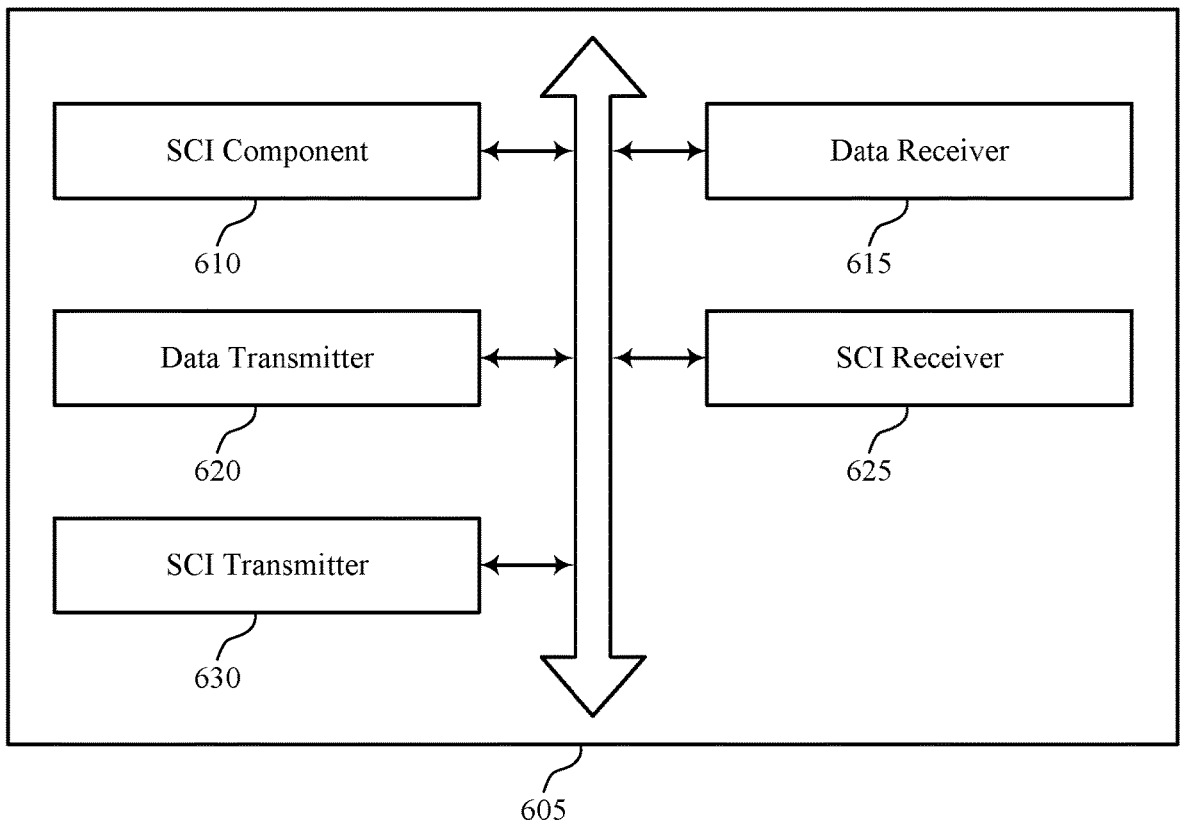
FIG. 6 shows a block diagram of a communications manager that supports chained sidelink transmissions in accordance with aspects of the present disclosure.

FIG. 6 shows a block diagram 600 of a communications manager 605 that supports chained sidelink transmissions in accordance with aspects of the present disclosure. The communications manager 605 may be an example of aspects of a communications manager 415, a communications manager 515, or a communications manager 710 described herein. The communications manager 605 may include a SCI component 610, a data receiver 615, a data transmitter 620, a SCI receiver 625, and a SCI transmitter 630. Each of these modules may communicate, directly or indirectly, with one another (e.g., via one or more buses).

The SCI component 610 may receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission.

In some examples, the SCI component 610 may transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission.

In some examples, the SCI component 610 may validate the second reservation of the second set of resources for the second data transmission by attempting to detect the second data transmission.

In some examples, the SCI component 610 may reserve autonomously at the first UE the first set of resources and the second set of resources.

In some examples, the SCI component 610 may receive a grant from a base station indicating the first set of resources.

In some examples, the SCI component 610 may reserve autonomously at the first UE the second set of resources.

In some cases, the sidelink control information includes a sidelink control information message.

In some cases, the sidelink control information includes a first sidelink control information message associated with the first reservation and a second sidelink control information message associated with the second reservation.

In some cases, the first sidelink control information message and the second sidelink control information message include stage one sidelink control information messages.

In some cases, the second sidelink control information message includes an identifier that identifies the second UE, a receiving UE of the second data transmission, or both.

In some cases, the first set of resources and the second set of resources are from separate resource pools.

In some cases, the sidelink control information indicates a third set of resources for a third data transmission from the second UE in response to the first data transmission.

In some cases, the second set of resources and the third set of resources schedule the second data transmission and the third data transmission for simultaneous transmission.

In some cases, the second set of resources and the third set of resources schedule the second data transmission and the third data transmission with a timing offset.

In some cases, the sidelink control information includes a sidelink control information message.

In some cases, the sidelink control information includes a first sidelink control information message associated with the first reservation and a second sidelink control information message associated with the second reservation.

In some cases, the first sidelink control information message and the second sidelink control information message include stage one sidelink control information messages.

In some cases, the second sidelink control information message includes an identifier that identifies the second UE, a receiving UE of the second data transmission, or both.

In some cases, the first set of resources and the second set of resources are from separate resource pools.

In some cases, the sidelink control information indicates a third set of resources for a third data transmission from the second UE in response to the first data transmission.

In some cases, the second set of resources and the third set of resources schedule the second data transmission and the third data transmission for simultaneous transmission.

In some cases, the second set of resources and the third set of resources schedule the second data transmission and the third data transmission with a timing offset.

The data receiver 615 may receive, from the first UE at the second UE, the first data transmission over the first set of resources.

In some examples, the data receiver 615 may receive, from the second UE, the second data transmission over the second set of resources.

The data transmitter 620 may transmit, from the second UE, the second data transmission using the second set of resources.

In some examples, the data transmitter 620 may transmit, from the first UE to the second UE, the first data transmission using the first set of resources.

In some examples, the data transmitter 620 may transmit the second data transmission to the first UE.

In some examples, the data transmitter 620 may transmit the second data transmission to a third UE that is associated with the first UE.

The SCI Receiver 625 may receive updated sidelink control information that indicates a modification to the second reservation of the second set of resources for the second data transmission.

In some examples, the SCI Receiver 625 may receive subsequent sidelink control information that voids any previously transmitted sidelink control information with a same identifier as the subsequent sidelink control information.

The SCI transmitter 630 may transmit updated sidelink control information that indicates a modification to the second reservation of the second set of resources for the second data transmission.

In some examples, the SCI transmitter 630 may transmit subsequent sidelink control information that voids any previously transmitted sidelink control information with a same identifier as the subsequent sidelink control information.

Figure 7:
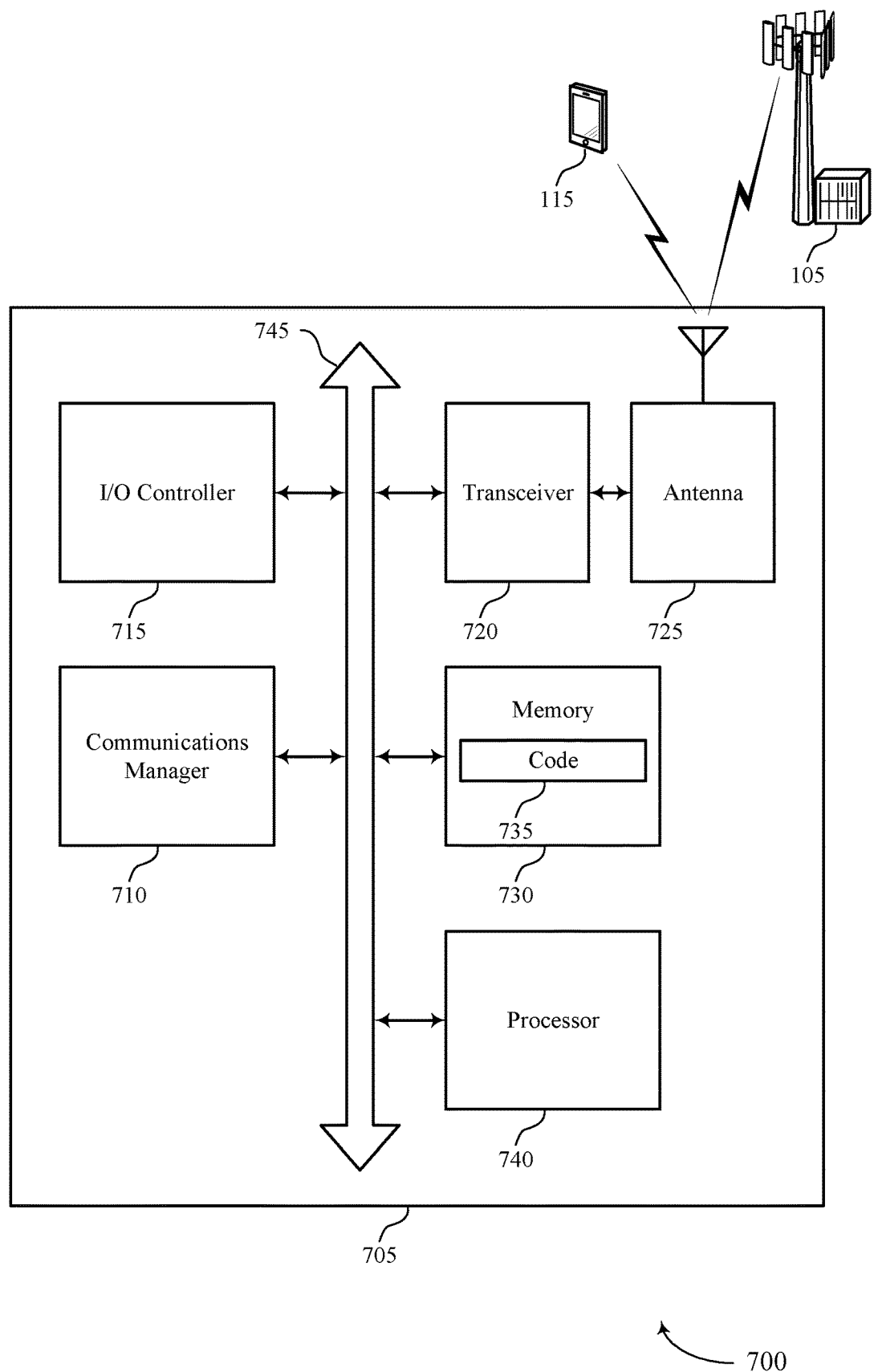
FIG. 7 shows a diagram of a system including a device that supports chained sidelink transmissions in accordance with aspects of the present disclosure.

FIG. 7 shows a diagram of a system 700 including a device 705 that supports chained sidelink transmissions in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission, receive, from the first UE at the second UE, the first data transmission over the first set of resources, and transmit, from the second UE, the second data transmission using the second set of resources. The communications manager 710 may also transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission and transmit, from the first UE to the second UE, the first data transmission using the first set of resources.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting chained sidelink transmissions).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
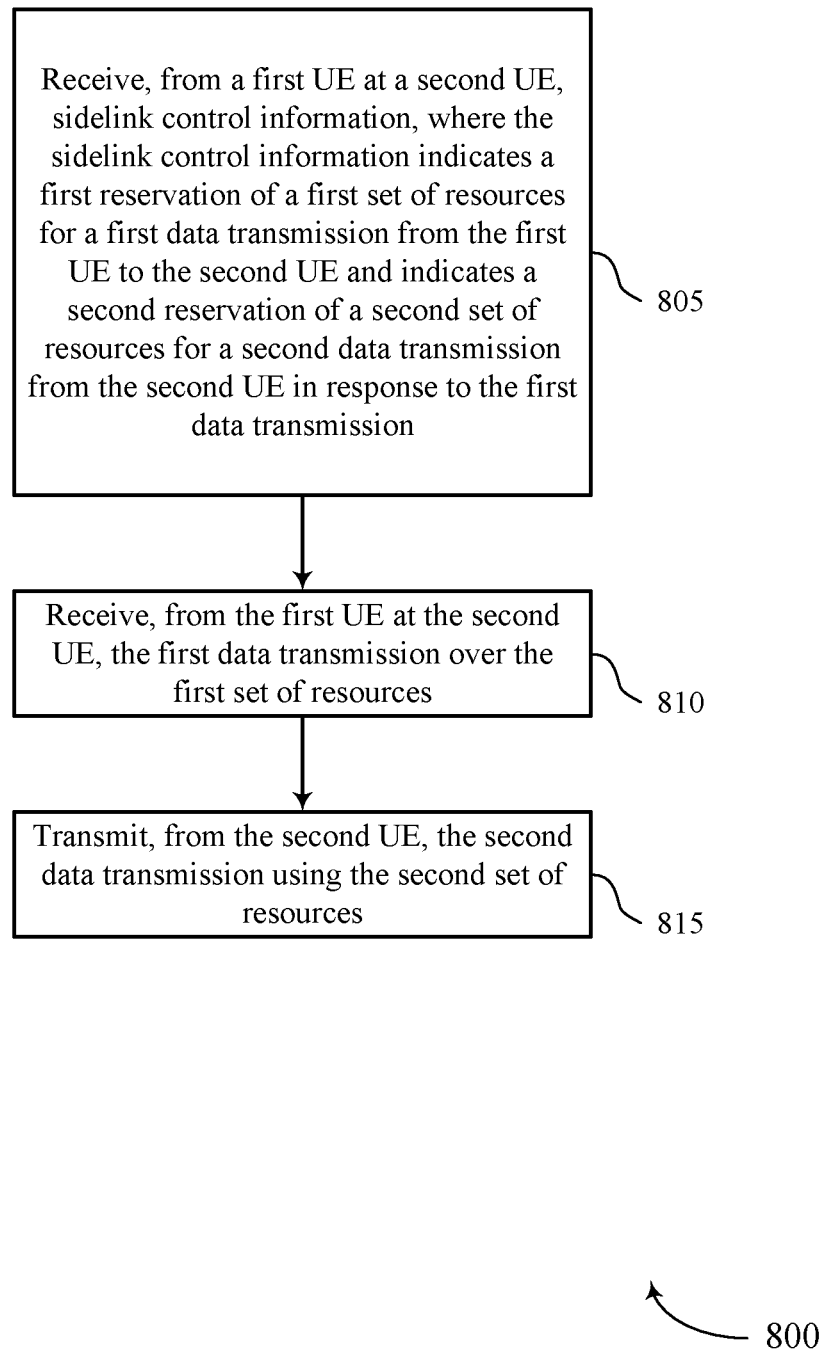
FIGS. 8 through 13 show flowcharts illustrating methods that support chained sidelink transmissions in accordance with aspects of the present disclosure.

FIG. 8 shows a flowchart illustrating a method 800 that supports chained sidelink transmissions in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The operations of 805 may be performed according to the methods described herein. In some examples, aspects of the operations of 805 may be performed by a SCI component as described with reference to FIGS. 4 through 7.

At 810, the UE may receive, from the first UE at the second UE, the first data transmission over the first set of resources. The operations of 810 may be performed according to the methods described herein. In some examples, aspects of the operations of 810 may be performed by a data receiver as described with reference to FIGS. 4 through 7.

At 815, the UE may transmit, from the second UE, the second data transmission using the second set of resources. The operations of 815 may be performed according to the methods described herein. In some examples, aspects of the operations of 815 may be performed by a data transmitter as described with reference to FIGS. 4 through 7.

Figure 9:
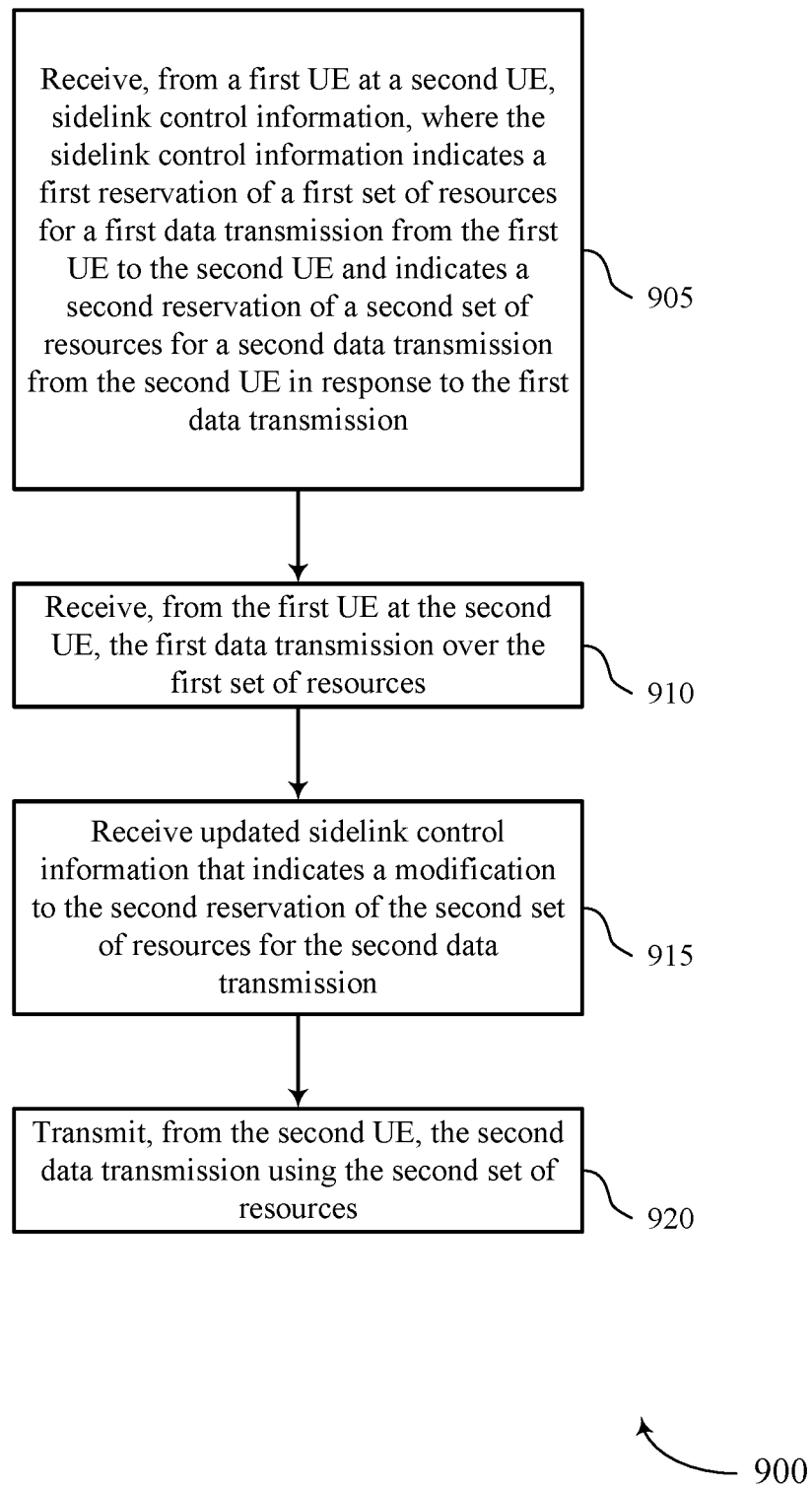

FIG. 9 shows a flowchart illustrating a method 900 that supports chained sidelink transmissions in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The operations of 905 may be performed according to the methods described herein. In some examples, aspects of the operations of 905 may be performed by a SCI component as described with reference to FIGS. 4 through 7.

At 910, the UE may receive, from the first UE at the second UE, the first data transmission over the first set of resources. The operations of 910 may be performed according to the methods described herein. In some examples, aspects of the operations of 910 may be performed by a data receiver as described with reference to FIGS. 4 through 7.

At 915, the UE may receive updated sidelink control information that indicates a modification to the second reservation of the second set of resources for the second data transmission. The operations of 915 may be performed according to the methods described herein. In some examples, aspects of the operations of 915 may be performed by a SCI Receiver as described with reference to FIGS. 4 through 7.

At 920, the UE may transmit, from the second UE, the second data transmission using the second set of resources. The operations of 920 may be performed according to the methods described herein. In some examples, aspects of the operations of 920 may be performed by a data transmitter as described with reference to FIGS. 4 through 7.

Figure 10:
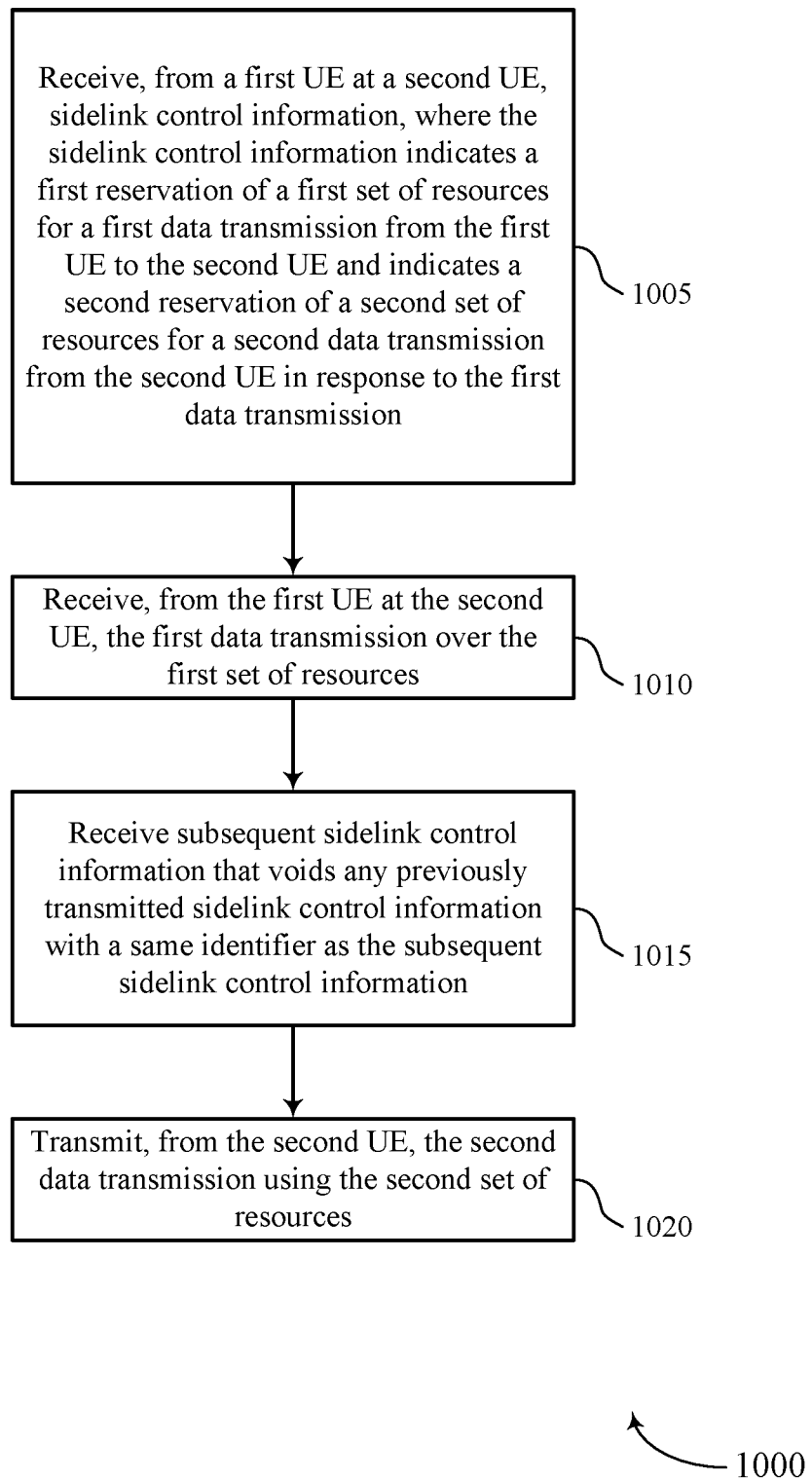

FIG. 10 shows a flowchart illustrating a method 1000 that supports chained sidelink transmissions in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may receive, from a first UE at a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The operations of 1005 may be performed according to the methods described herein. In some examples, aspects of the operations of 1005 may be performed by a SCI component as described with reference to FIGS. 4 through 7.

At 1010, the UE may receive, from the first UE at the second UE, the first data transmission over the first set of resources. The operations of 1010 may be performed according to the methods described herein. In some examples, aspects of the operations of 1010 may be performed by a data receiver as described with reference to FIGS. 4 through 7.

At 1015, the UE may receive subsequent sidelink control information that voids any previously transmitted sidelink control information with a same identifier as the subsequent sidelink control information. The operations of 1015 may be performed according to the methods described herein. In some examples, aspects of the operations of 1015 may be performed by a SCI Receiver as described with reference to FIGS. 4 through 7.

At 1020, the UE may transmit, from the second UE, the second data transmission using the second set of resources. The operations of 1020 may be performed according to the methods described herein. In some examples, aspects of the operations of 1020 may be performed by a data transmitter as described with reference to FIGS. 4 through 7.

Figure 11:
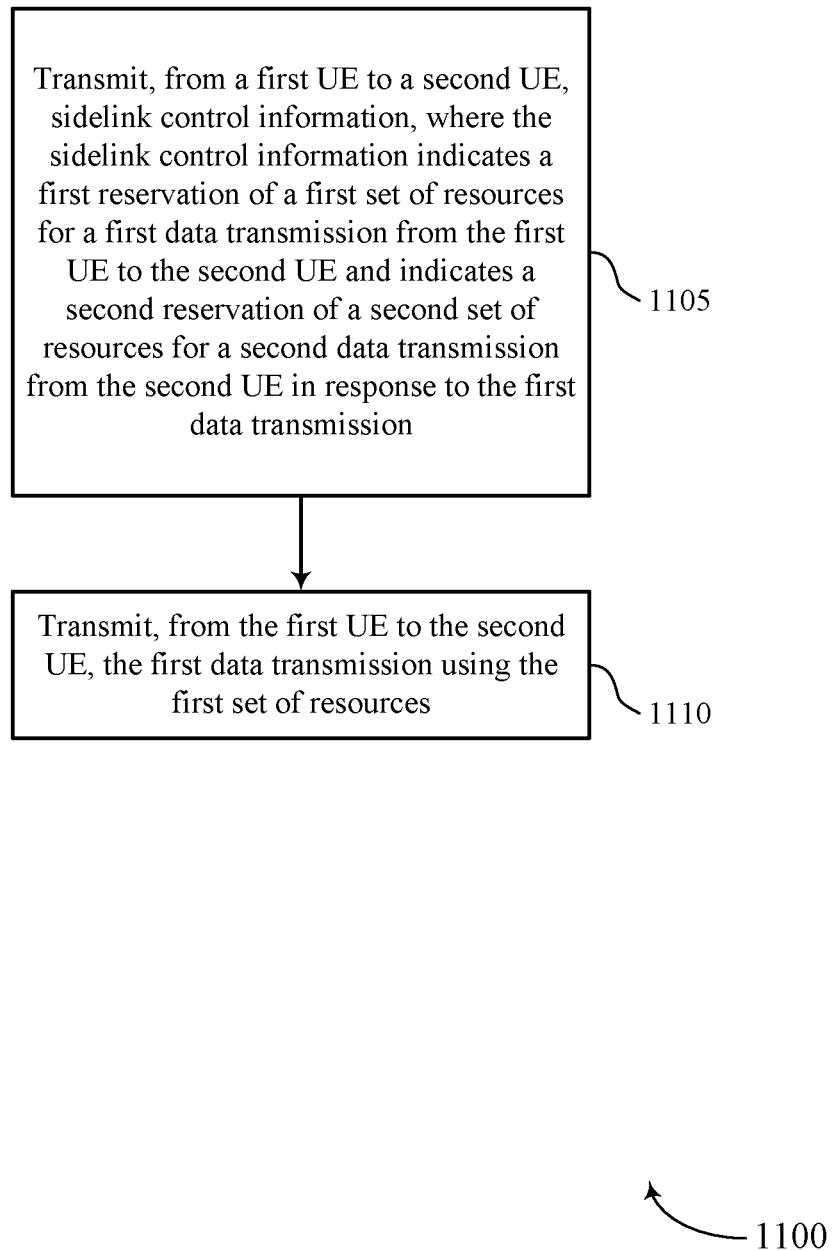

FIG. 11 shows a flowchart illustrating a method 1100 that supports chained sidelink transmissions in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The operations of 1105 may be performed according to the methods described herein. In some examples, aspects of the operations of 1105 may be performed by a SCI component as described with reference to FIGS. 4 through 7.

At 1110, the UE may transmit, from the first UE to the second UE, the first data transmission using the first set of resources. The operations of 1110 may be performed according to the methods described herein. In some examples, aspects of the operations of 1110 may be performed by a data transmitter as described with reference to FIGS. 4 through 7.

Figure 12:
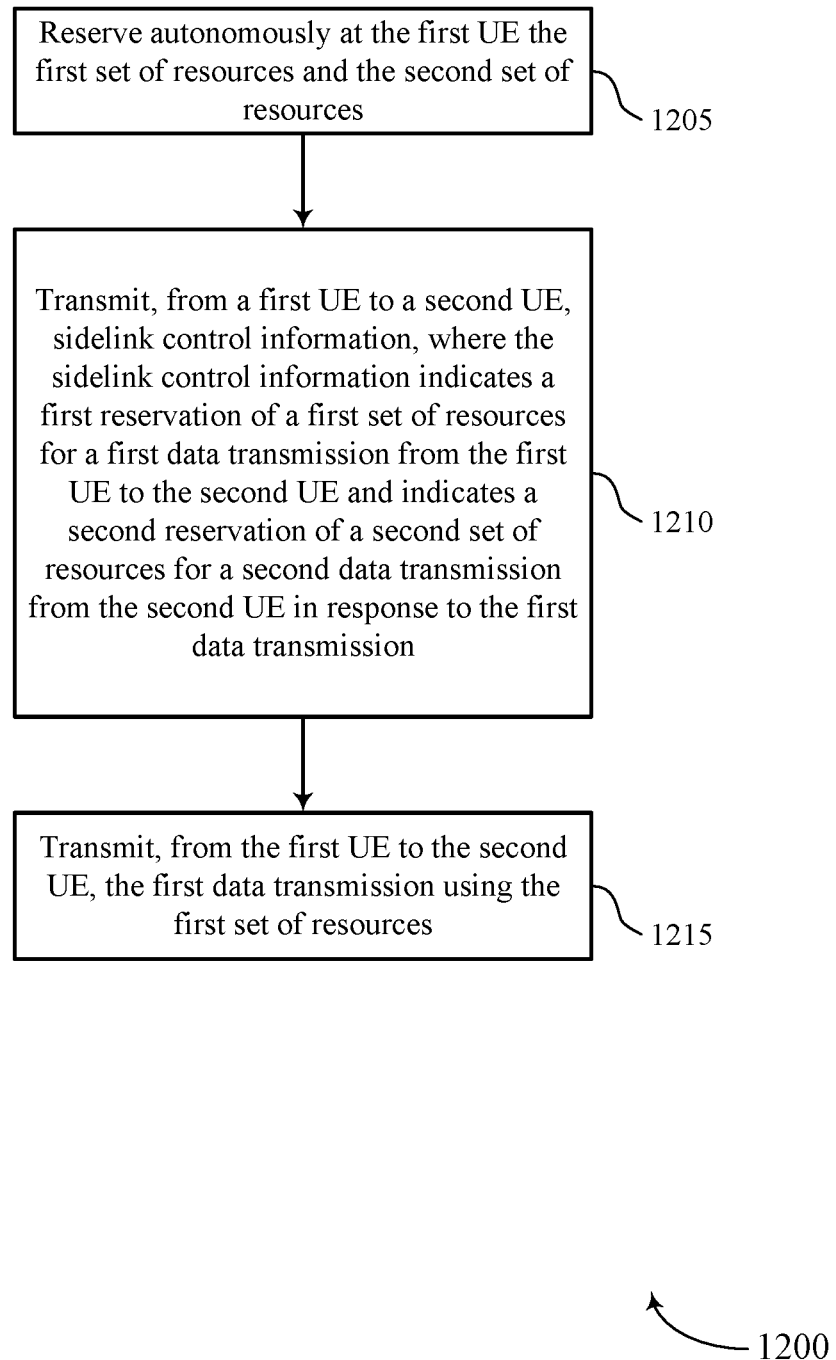

FIG. 12 shows a flowchart illustrating a method 1200 that supports chained sidelink transmissions in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may reserve autonomously at the first UE the first set of resources and the second set of resources. The operations of 1205 may be performed according to the methods described herein. In some examples, aspects of the operations of 1205 may be performed by a SCI component as described with reference to FIGS. 4 through 7.

At 1210, the UE may transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The operations of 1210 may be performed according to the methods described herein. In some examples, aspects of the operations of 1210 may be performed by a SCI component as described with reference to FIGS. 4 through 7.

At 1215, the UE may transmit, from the first UE to the second UE, the first data transmission using the first set of resources. The operations of 1215 may be performed according to the methods described herein. In some examples, aspects of the operations of 1215 may be performed by a data transmitter as described with reference to FIGS. 4 through 7.

Figure 13:
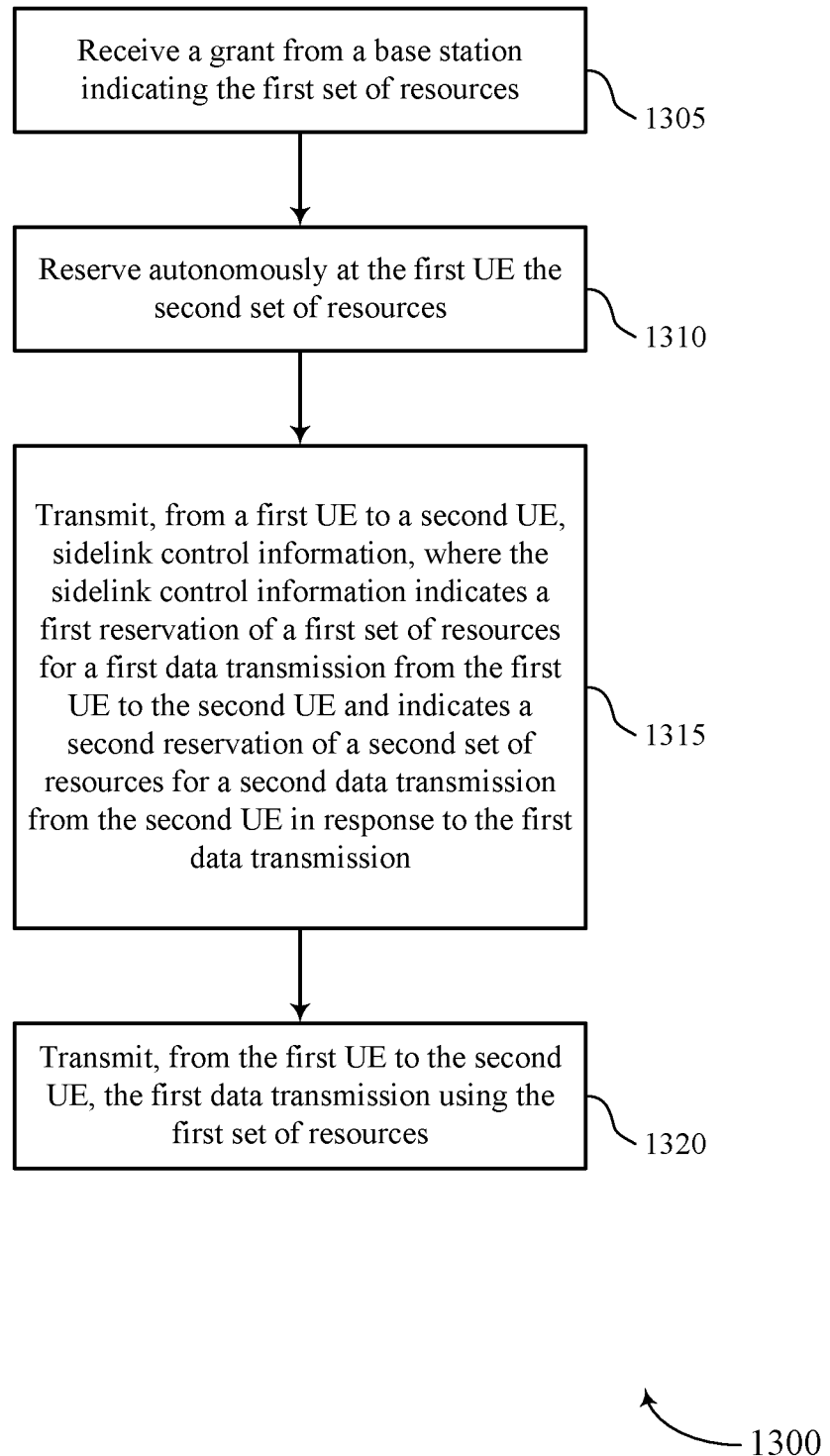

FIG. 13 shows a flowchart illustrating a method 1300 that supports chained sidelink transmissions in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive a grant from a base station indicating the first set of resources. The operations of 1305 may be performed according to the methods described herein. In some examples, aspects of the operations of 1305 may be performed by a SCI component as described with reference to FIGS. 4 through 7.

At 1310, the UE may reserve autonomously at the first UE the second set of resources. The operations of 1310 may be performed according to the methods described herein. In some examples, aspects of the operations of 1310 may be performed by a SCI component as described with reference to FIGS. 4 through 7.

At 1315, the UE may transmit, from a first UE to a second UE, sidelink control information, where the sidelink control information indicates a first reservation of a first set of resources for a first data transmission from the first UE to the second UE and indicates a second reservation of a second set of resources for a second data transmission from the second UE in response to the first data transmission. The operations of 1315 may be performed according to the methods described herein. In some examples, aspects of the operations of 1315 may be performed by a SCI component as described with reference to FIGS. 4 through 7.

At 1320, the UE may transmit, from the first UE to the second UE, the first data transmission using the first set of resources. The operations of 1320 may be performed according to the methods described herein. In some examples, aspects of the operations of 1320 may be performed by a data transmitter as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    receiving, over a sidelink from a first user equipment (UE) at a second UE, sidelink control information, wherein the sidelink control information comprises a first indication of a first reservation of a first set of resources to be used by the second UE for receiving a first data transmission from the first UE, and wherein the sidelink control information further comprises a second indication of a second reservation of a second set of resources to be used by the second UE for transmitting a second data transmission from the second UE, wherein the second data transmission from the second UE is a chained transmission in response to the first data transmission from the first UE;
    receiving, from the first UE at the second UE, updated sidelink control information that indicates a modification to the second reservation of the second set of resources for the second data transmission;
    receiving, from the first UE at the second UE and after receiving the sidelink control information, the first data transmission over the first set of resources based at least in part on the first reservation indicated in the sidelink control information from the first UE; and
    transmitting, from the second UE, the second data transmission using the second set of resources based at least in part on the second reservation indicated in the sidelink control information from the first UE or the modification to the second reservation.

2. The method of claim 1, further comprising:
    receiving subsequent sidelink control information that voids any previously transmitted sidelink control information with a same identifier as the subsequent sidelink control information.

3. The method of claim 1, wherein the sidelink control information comprises a sidelink control information message.

4. The method of claim 1, wherein the sidelink control information comprises a first sidelink control information message associated with the first reservation and a second sidelink control information message associated with the second reservation.

5. The method of claim 4, wherein the first sidelink control information message and the second sidelink control information message comprise stage one sidelink control information messages.

6. The method of claim 4, wherein the second sidelink control information message comprises an identifier that identifies the second UE, a receiving UE of the second data transmission, or both.

7. The method of claim 1, wherein transmitting the second data transmission comprises:
    transmitting the second data transmission to the first UE.

8. The method of claim 1, wherein transmitting the second data transmission comprises:
    transmitting the second data transmission to a third UE that is associated with the first UE.

9. The method of claim 1, wherein the first set of resources and the second set of resources are from separate resource pools.

10. The method of claim 1, wherein the sidelink control information indicates a third set of resources for a third data transmission from the second UE in response to the first data transmission.

11. The method of claim 10, wherein the second set of resources and the third set of resources schedule the second data transmission and the third data transmission for simultaneous transmission.

12. The method of claim 10, wherein the second set of resources and the third set of resources schedule the second data transmission and the third data transmission with a timing offset.

13. The method of claim 1, further comprising:
    validating the second reservation of the second set of resources for the second data transmission by attempting to detect the second data transmission.

14. The method of claim 1,
    wherein the updated sidelink control information voids any previously transmitted sidelink control information with a same identifier as the updated sidelink control information.

15. A method for wireless communications, comprising:
    transmitting, over a sidelink from a first user equipment (UE) to a second UE, sidelink control information, wherein the sidelink control information comprises a first indication of a first reservation of a first set of resources to be used by the first UE for transmitting a first data transmission from the first UE to the second UE, and wherein the sidelink control information further comprises a second indication of a second reservation of a second set of resources to be used by the second UE for transmitting a second data transmission from the second UE, wherein the second data transmission from the second UE is a chained transmission in response to the first data transmission from the first UE;
    transmitting, from the first UE to the second UE, updated sidelink control information that indicates a modification to the second reservation of the second set of resources for the second data transmission; and transmitting, from the first UE to the second UE and after transmitting the sidelink control information, the first data transmission using the first set of resources based at least in part on the first reservation indicated in the sidelink control information from the first UE.

16. The method of claim 15, further comprising:
reserving autonomously at the first UE the first set of resources and the second set of resources.

17. The method of claim 15, further comprising:
receiving a grant from a base station indicating the first set of resources; and
reserving autonomously at the first UE the second set of resources.

18. The method of claim 15, further comprising:
transmitting subsequent sidelink control information that voids any previously transmitted sidelink control information with a same identifier as the subsequent sidelink control information.

19. The method of claim 15, wherein the sidelink control information comprises a sidelink control information message.

20. The method of claim 15, wherein the sidelink control information comprises a first sidelink control information message associated with the first reservation and a second sidelink control information message associated with the second reservation.

21. The method of claim 20, wherein the first sidelink control information message and the second sidelink control information message comprise stage one sidelink control information messages.

22. The method of claim 20, wherein the second sidelink control information message comprises an identifier that identifies the second UE, a receiving UE of the second data transmission, or both.

23. The method of claim 15, further comprising:
receiving, from the second UE, the second data transmission over the second set of resources.

24. The method of claim 15, wherein the first set of resources and the second set of resources are from separate resource pools.

25. The method of claim 15, wherein the sidelink control information indicates a third set of resources for a third data transmission from the second UE in response to the first data transmission.

26. The method of claim 25, wherein the second set of resources and the third set of resources schedule the second data transmission and the third data transmission for simultaneous transmission.

27. The method of claim 25, wherein the second set of resources and the third set of resources schedule the second data transmission and the third data transmission with a timing offset.

28. The method of claim 15,
wherein the updated sidelink control information voids any previously transmitted sidelink control information with a same identifier as the updated sidelink control information.

29. An apparatus for wireless communications, comprising:
a processor,
memory coupled with the processor; and
instructions stored in the memory and executable by the processor to cause the apparatus to:
receive, over a sidelink from a first user equipment (UE) at a second UE, sidelink control information, wherein the sidelink control information comprises a first indication of a first reservation of a first set of resources to be used by the second UE for receiving a first data transmission from the first UE, and wherein the sidelink control information further comprises a second indication of a second reservation of a second set of resources to be used by the second UE for transmitting a second data transmission from the second UE, wherein the second data transmission from the second UE is a chained transmission in response to the first data transmission from the first UE;
receive, from the first UE at the second UE, updated sidelink control information that indicates a modification to the second reservation of the second set of resources for the second data transmission;
receive, from the first UE at the second UE and after receiving the sidelink control information, the first data transmission over the first set of resources based at least in part on the first reservation indicated in the sidelink control information from the first UE; and
transmit, from the second UE, the second data transmission using the second set of resources based at least in part on the second reservation indicated in the sidelink control information from the first UE or the modification to the second reservation.

30. An apparatus for wireless communications, comprising:
a processor,
memory coupled with the processor; and
instructions stored in the memory and executable by the processor to cause the apparatus to:
transmit, over a sidelink from a first user equipment (UE) to a second UE, sidelink control information, wherein the sidelink control information comprises a first indication of a first reservation of a first set of resources to be used by the first UE for transmitting a first data transmission from the first UE to the second UE, and wherein the sidelink control information further comprises a second indication of a second reservation of a second set of resources to be used by the second UE for transmitting a second data transmission from the second UE, wherein the second data transmission from the second UE is a chained transmission in response to the first data transmission from the first UE;
transmit, from the first UE to the second UE, updated sidelink control information that indicates a modification to the second reservation of the second set of resources for the second data transmission; and
transmit, from the first UE to the second UE and after transmitting the sidelink control information, the first data transmission using the first set of resources based at least in part on the first reservation indicated in the sidelink control information from the first UE.

* * * * *